United States Patent [19]

Sawahashi et al.

[11] Patent Number: 5,774,494
[45] Date of Patent: Jun. 30, 1998

[54] FREQUENCY ERROR CORRECTION DEVICE OF A SPREAD-SPECTRUM COMMUNICATION RECEIVER

[75] Inventors: Mamoru Sawahashi, Yokosuka; Tomohiro Dohi, Yokohama, both of Japan

[73] Assignee: NTT Mobile Communications Network Inc., Tokyo, Japan

[21] Appl. No.: 342,349

[22] Filed: Nov. 18, 1994

[30] Foreign Application Priority Data

Nov. 26, 1993 [JP] Japan .................................... 5-295891

[51] Int. Cl.[6] .................................................. H04B 15/00
[52] U.S. Cl. ......................... 375/207; 375/208; 375/343; 375/344
[58] Field of Search .................................... 375/200, 205, 375/207–210, 316, 324–328, 343, 344; 329/304, 306

[56] References Cited

U.S. PATENT DOCUMENTS

| | | | |
|---|---|---|---|
| 4,328,587 | 5/1982 | Mizuno et al. | 375/326 |
| 4,630,283 | 12/1986 | Schiff | 375/200 |
| 4,706,286 | 11/1987 | Sturza | 380/34 |
| 5,049,830 | 9/1991 | Yoshida | 375/326 |
| 5,131,008 | 7/1992 | Kazecki et al. | 375/344 |
| 5,293,398 | 3/1994 | Hamao et al. | 375/207 |
| 5,402,450 | 3/1995 | Lennen | 375/343 |

Primary Examiner—Stephen Chin
Assistant Examiner—Amanda T. Le
Attorney, Agent, or Firm—Rogers & Wells

[57] ABSTRACT

A frequency correction device for a spread-spectrum communication receiver requiring no high-accuracy, high-stable VCO as a local signal oscillator. It includes a quasi-coherent quadrature detector detecting an intermediate frequency signal using a local signal from a fixed frequency local oscillator, a correlation detector producing a despread signal by demodulating the output of the detector, a clock signal generating portion generating a pair of clock signals whose frequency is deviated a little with respect to a clock signal for driving the correlation detector. The pair of clock signals are used to drive two correlation detectors, and the amplitude of the outputs of the correlation detectors are squared, and then subtracted, thereby generating a correlation output error signal. Since the correlation output error signal has one to one correspondence with the frequency difference between the chip frequency of the spread spectrum signal outputted from the quasi-coherent quadrature detector and the frequency of the clock signal, a frequency correction signal can be generated by converting the correlation output error signal into the frequency error. The frequency difference between despread signal and the clock signal, which arises from the difference between the center frequency of a received signal and the local signal, can be corrected by correcting the frequency of the despread signal by the frequency correction signal.

8 Claims, 3 Drawing Sheets

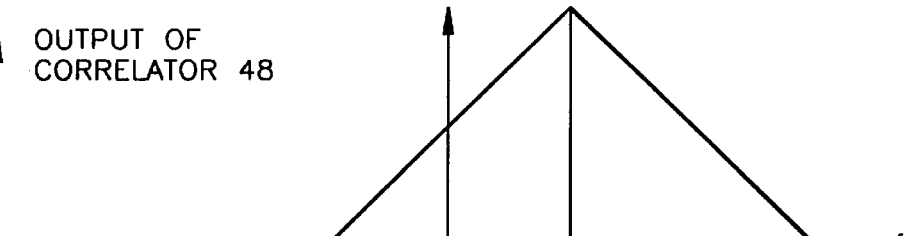
FIG. 3A OUTPUT OF CORRELATOR 48
CHIP FREQUENCY OF $S_{2I}$ AND $S_{2Q}$
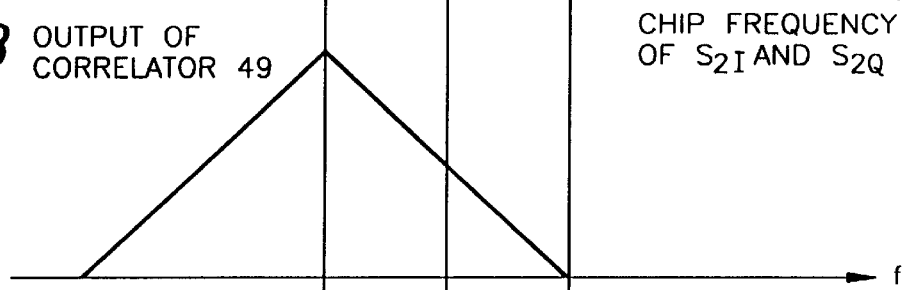
FIG. 3B OUTPUT OF CORRELATOR 49
CHIP FREQUENCY OF $S_{2I}$ AND $S_{2Q}$
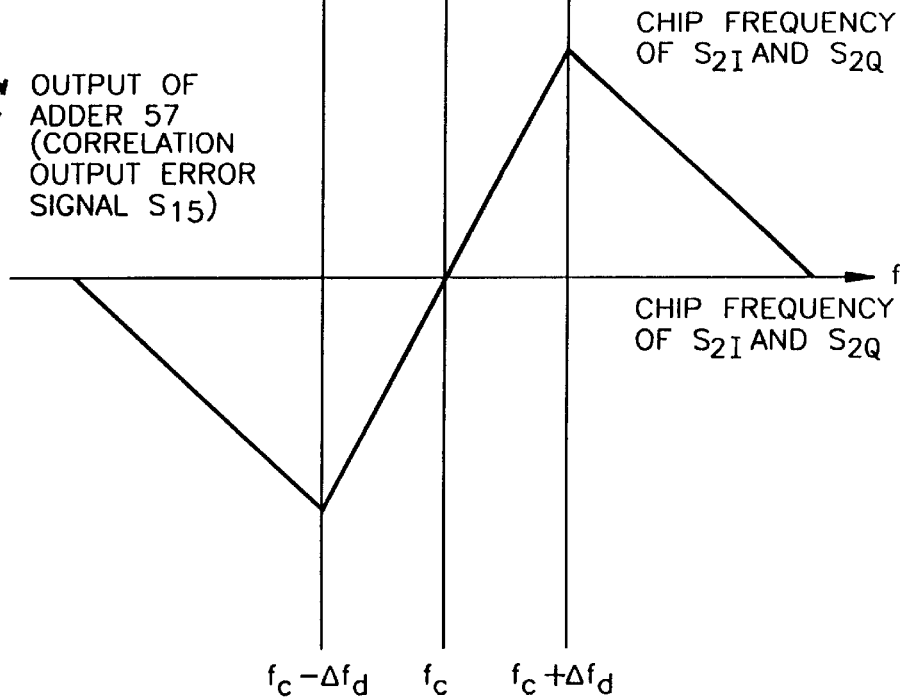
FIG. 3C OUTPUT OF ADDER 57 (CORRELATION OUTPUT ERROR SIGNAL $S_{15}$)
CHIP FREQUENCY OF $S_{2I}$ AND $S_{2Q}$
$f_c - \Delta f_d$    $f_c$    $f_c + \Delta f_d$

FREQUENCY ERROR CORRECTION DEVICE OF A SPREAD-SPECTRUM COMMUNICATION RECEIVER

BACKGROUND OF THE INVENTION

1. Field of the Invention

The present invention relates to a receiver in a CDMA (Code Division Multiple Access) communication system preferably applied to mobile communications, and particularly, to a frequency error correction device of a spread-spectrum communication receiver which corrects a frequency error between a transmitter and the receiver in a baseband signal range.

2. Description of Related Art

Recently, intensive research and development of CDMA systems have been carried out. The access method of the CDMA systems are roughly divided into direct sequence (DS) multiple access and frequency hopping (FH) multiple access. The FH multiple access, however, is seldom used today. This is because although it is necessary for the FH multiple access to divide a symbol into units called a chip, and switch the frequency of a carrier signal to different frequencies for each chip at a high speed, a frequency synthesizer for switching the carrier frequency at a high speed is difficult to realize in the state of the art.

Accordingly, the DS multiple access is usually used. A DS multiple access system carries out, at a transmission side, a primary modulation of original data by QPSK or the like, and a secondary modulation (spreading) of the primary modulation signal into a wideband signal using a spreading code, and transmits the secondary modulation signal on a carrier. At a receiving side, on the other hand, the carrier signal is removed, and then, the wideband signal is despread using the same spreading code as at the transmission side, and subsequently the original data is restored.

Let us consider problems which can arise when the CDMA system is applied to mobile communication system such as pocket telephones. A base station of the current mobile communications has a highly-stable reference oscillator, and the Japanese Standard for Digital Carphones requires absolute accuracy less than 0.005 ppm. On the other hand, since a mobile station cannot use a highly-stable reference oscillator with a thermostat, it usually uses a temperature compensated crystal oscillator (TCXO). The frequency accuracy of the crystal oscillator is 3 ppm in terms of absolute accuracy at 800 MHz.

Therefore, the frequency of a local signal of a mobile station will deviate from the center frequency of the transmission signal of a base station (that is, the received signal of the mobile station). In addition, the chip frequency at the receiving side will also deviate from the chip frequency at the transmission side. Furthermore, since the mobile station moves with respect to the base station, the center frequency of the received signal changes by an amount corresponding to the Doppler frequency.

Thus, the frequency error between the transmitting side and the receiving side includes the frequency deviation between the center frequency of the received signal and the local signal, the frequency deviation between the chip frequency of a despread signal and the frequency of a chip clock signal used for despreading, and the frequency deviation due to the Doppler effect. The two former deviations are due to the frequency error between the reference oscillator of the transmitter and that of the receiver. Compensation for this frequency error to establish a stable receiving operation will require an AFC (Automatic Frequency Control) circuit.

FIG. 1 shows a major portion of a conventional CDMA receiver including an AFC circuit. An intermediate frequency (IF) received signal applied to an input terminal 10 is divided into two parts by a hybrid coil 10A, and is supplied to a quadrature detector 11. The quadrature detector 11 detects the IF received signal using a local signal from a VCO (Voltage Controlled Oscillator) 12, and outputs an in-phase baseband signal I and a quadrature baseband signal Q. The term "baseband signal" in this specification refers to a signal having no carrier signal component. More specifically, the baseband signal at the transmitting side includes a signal after the primary modulation, and a signal after the spreading (secondary modulation), and the baseband signal at the receiving side includes a signal after the quadrature detection and before the despreading, and a signal after despreading. The I baseband signal is supplied to an A/D converter 15 through an LPF (Low-Pass Filter) 13, and is converted into a digital signal. Similarly, the Q baseband signal is supplied to an A/D converter 16 through an LPF 14, and is converted into a digital signal.

These digital signals are supplied to a correlation detector 17 such as a matched filter or a sliding correlator, which detects the correlation between the digital signals and a spreading code, and despread the digital signals. In other words, the correlation detector 17 functions as a despreading circuit, and outputs a baseband signal corresponding to a primary modulation signal, that is, a despread signal. The output of the correlation detector 17 is supplied to a RAKE combiner and demodulator 18. The RAKE combiner and demodulator 18, estimating phases of signals which have travelled through respective multiple paths and constitute the received signal, demodulates the despread signal corresponding to the primary modulation signal by combining the signals whose phases are estimated and aligned, and decides the original data (intended received signal).

An AFC circuit 20 is arranged as follows: The output of the correlation detector 17 is supplied to a delay detector 21. The delay detected signal is supplied to a phase error detector 22, which obtains a phase error component $\tan^{-1}$ (I/Q) from the I and Q components of the delay detected signal. The phase error component is a signal representing the phase error, that is, the phase shift of the baseband signal outputted from the correlation detector 17 with respect to the mapping points of the primary modulation signal at the transmitting side. In other words, the phase error signal is in proportion to the frequency error between the received signal and the local signal. The phase error signal is averaged by a loop filter 23, and is fed back to the VCO 12 as a control voltage. Thus, the VCO 12 is subject to the feedback control in accordance with an error correction signal corresponding to the phase error, so that the error between the center frequency of the received signal and the frequency of the local signal is corrected.

The conventional receiver has a problem in that it requires a highly-accurate, highly-stable VCO 12, and this results in an expensive mobile station.

SUMMARY OF THE INVENTION

It is therefore an object of the present invention to provide an inexpensive frequency error correction device of a spread-spectrum communication receiver which can be easily incorporated into an IC (Integrated Circuit).

According to an aspect of the present invention, there is provided a frequency error correction device of a spread spectrum receiver which receives a spread-spectrum signal, the frequency error correction device comprising:

a first correlation detector despreading the spread-spectrum signal;

a first clock signal generating portion for producing a first clock signal for driving the first correlation detector;

a frequency error detection circuit detecting a frequency error between a chip frequency of the spread-spectrum signal and a frequency of the first clock signal, thereby producing a frequency correction signal; and a frequency drift correction portion performing frequency correction of an output of the first correlation detector in accordance with the frequency correction signal outputted from the frequency error detection circuit.

Here, the frequency error detection circuit may comprise:

a second clock signal generating portion producing a second clock signal whose frequency is higher than the frequency of the first clock signal by a predetermined value;

a third clock signal generating portion producing a third clock signal whose frequency is lower than the frequency of the first clock signal by a predetermined value;

a second correlation detector despreading the spread-spectrum signal by using the second clock signal; and a third correlation detector despreading the spread-spectrum signal by using the third clock signal, wherein the frequency error is detected on the basis of a correlation output from the second correlation detector, and a correlation output from the third correlation detector.

The frequency error detection circuit may further comprise:

an adder subtracting the correlation output from the third correlation detector from the correlation output from the second correlation detector, thereby producing a correlation output error; and a correlation output error/frequency drift converter producing a frequency drift signal which becomes zero when the correlation output error is zero, and which changes in accordance with an S-curve characteristic as the absolute value of the correlation output error increases.

The correlation output error/frequency drift converter may comprise a memory circuit which stores the S-curve characteristic, receives the correlation output error as an address input, and produces the frequency drift signal as a data output.

The frequency error detection circuit may further comprise:

a first magnitude squared component generating portion producing a squared component of the magnitude of the correlation output of the second correlation detector;

a second magnitude squared component generating portion producing a squared component of the magnitude of the correlation output of the third correlation detector;

a first comparator comparing an output signal from the first magnitude squared component generating portion with a predetermined reference level, and producing a component that exceeds the reference level; and a second comparator comparing an output signal from the second magnitude squared component generating portion with the predetermined reference level, and producing a component that exceeds the reference level, wherein the adder subtracts an output from the second comparator from an output from the first comparator, and outputs the correlation output error.

The frequency error detection circuit may further comprise:

a first hold circuit connected between the first comparing circuit and the adder, and holding an output of the first comparing circuit; and a second hold circuit connected between the second comparing circuit and the adder, and holding an output of the second comparing circuit, wherein the adder subtracts an output of the second hold circuit from an output of the first hold circuit, and outputs the correlation output error.

The frequency error detection circuit may further comprise an averaging circuit averaging the data output of the memory circuit to produce the frequency correction signal.

According to the present invention, the frequency error between the transmitting side and the receiving side is obtained from the correlation outputs. Rotating the despread signal in the direction opposite to its phase by using the frequency error signal makes possible a stable correction of the frequency error by a digital signal processing. Consequently, the present invention can provide a frequency error correction device which can be easily embedded into an IC, and requires no expensive AFC circuit.

The above and other objects, effects, features and advantages of the present invention will become more apparent from the following description of the embodiment thereof taken in conjunction with the accompanying drawings.

BRIEF DESCRIPTION OF THE DRAWINGS

FIG. 3 is a graph showing the relationships between a frequency error and a correlation output error signal in the embodiment.

DETAILED DESCRIPTION OF PREFERRED EMBODIMENT

The invention will now be described with reference to the accompanying drawings.

Figure 1:
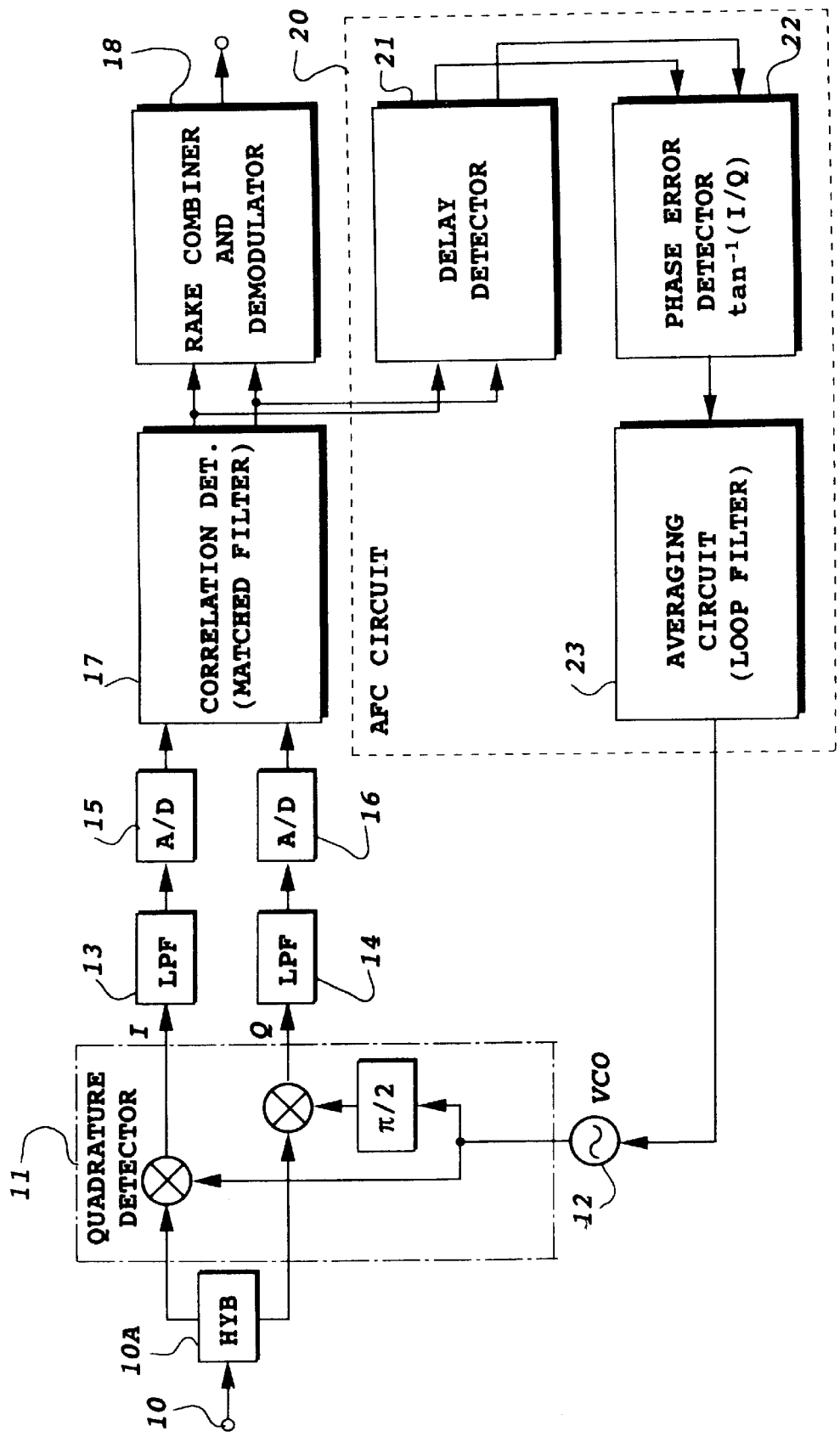
FIG. 1 is a block diagram showing a major portion of a conventional spread-spectrum communication receiver.
Figure 2:
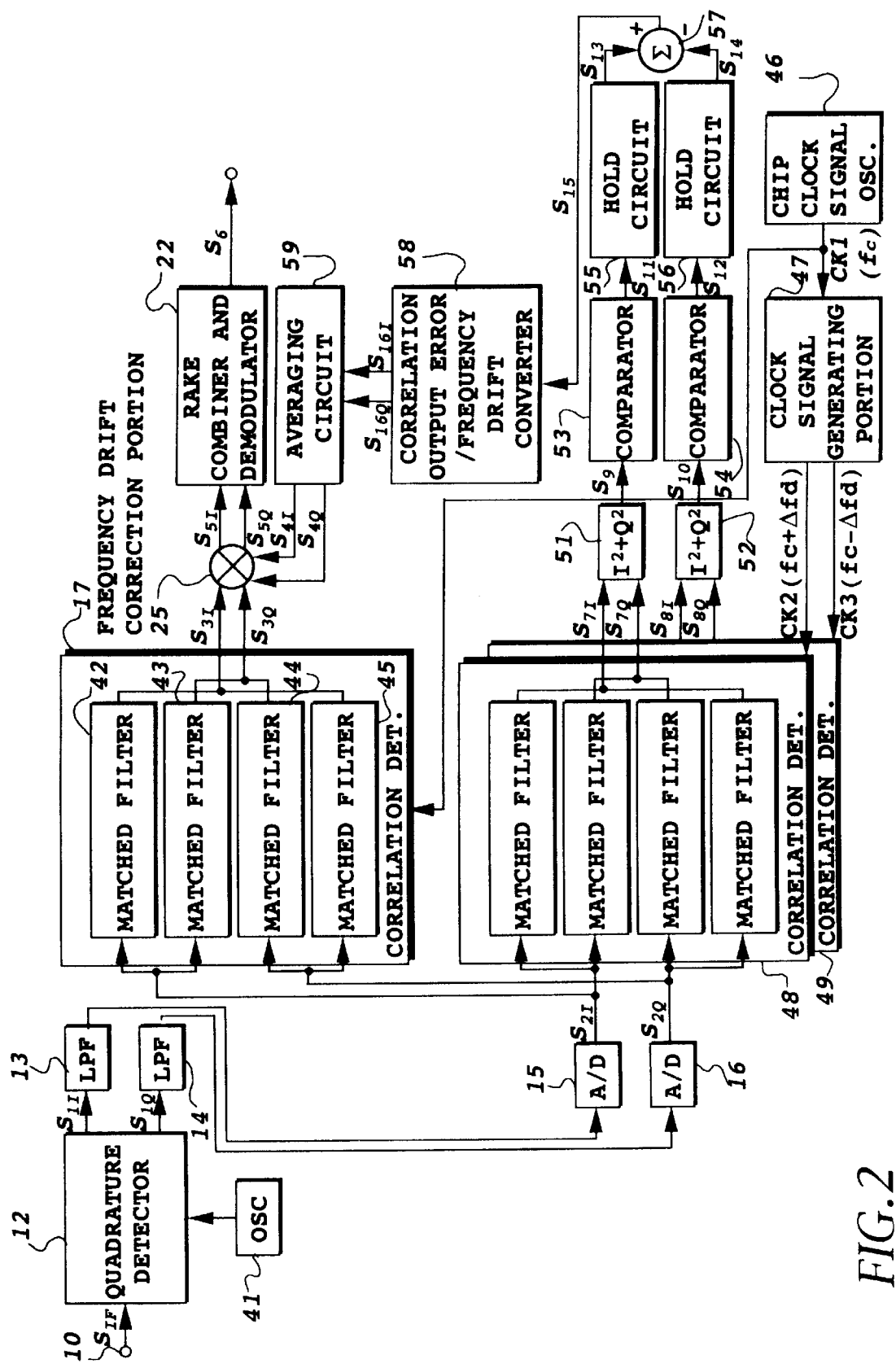
FIG. 2 is a block diagram showing an embodiment of a frequency correction device of a spread-spectrum communication receiver in accordance with the present invention.

FIG. 2 show an embodiment of a frequency error correction device of a spread-spectrum communication receiver in accordance with the present invention.

An intermediate frequency (IF) input signal $S_{IF}$ from an input terminal 10 is supplied to a quadrature detector 12. The quadrature detector 12 performs quasi-coherent quadrature detection of the IF input signal $S_{IF}$, and outputs an in-phase baseband signal $S_{1I}$ and a quadrature baseband signal $S_{1Q}$. Here, a term "quasi-coherent quadrature detection" is used because a local signal from a fixed frequency oscillator 41 includes a frequency error, and hence, true coherent quadrature detection is not achieved here. The baseband signal $S_{1I}$ is passed through a low-pass filter 13, and supplied to an A/D converter 15 which converts it into a digital signal $S_{2I}$. The digital signal $S_{2I}$ is supplied to three correlation detectors 17, 48 and 49. Likewise, the baseband signal $S_{1Q}$ is passed through a low-pass filter 14, and supplied to an A/D converter 16 which converts it into a digital signal $S_{2Q}$. The digital signal $S_{2Q}$ is supplied to the three correlation detectors 17, 48 and 49. These baseband signals $S_{1I}$ and $S_{1Q}$, and $S_{2I}$ and $S_{2Q}$ constitute spread-spectrum signals, respectively.

As the correlation detector 17, a circuit is known in which four matched filters 42–45 are connected as shown in FIG.

2. The correlation detector 17 is driven by a chip clock signal CK1 supplied from a chip clock signal oscillator 46, takes a correlation between a spreading code and the digital signals $S_{2I}$ and $S_{2Q}$, and despreads the digital signals under the condition that the correlation is kept maximum, that is, the digital signals are in synchronism with the spreading code, thereby producing despread signals $S_{3I}$ and $S_{3Q}$.

The despread signals $S_{3I}$ and $S_{3Q}$ from the correlation detector 17 are supplied to a frequency drift correction portion 25, which performs complex multiplication of the despread signals $S_{3I}$ and $S_{3Q}$ and frequency correction signals $S_{4I}$ and $S_{4Q}$ which will be mentioned later, and outputs digital signals $S_{5I}$ and $S_{5Q}$ which have undergone frequency error correction. Here, an in-phase component having a suffix I is represented in the form of $A\cos\omega t$, and a quadrature component having a suffix Q is represented in the form of $A\sin\omega t$. In addition, the complex multiplication is represented in the form of $(S_{3I}+jS_{3Q})(S_{4I}+jS_{4Q})$. The frequency error corrected signals $S_{5I}$ and $S_{5Q}$ are supplied to a RAKE combiner and demodulation circuit 22, which demodulates the original data $S_6$.

As mentioned above, the correlation detector 17 is driven by the chip clock signal CK1 whose frequency is $f_c$. The chip clock signal CK1 is generated by a chip clock signal oscillator 46, and is supplied to the correlation detector 17 and a clock signal generating portion 47. The clock signal generating portion 47 outputs a clock signal CK2 whose frequency is $f_c+\Delta f_d$, and a clock signal CK3 whose frequency is $f_c-\Delta f_d$. In other words, the clock signals CK2 and CK3 are generated whose frequencies are drifted from the chip clock signal CK1 by $+\Delta f_d$ and $-\Delta f_d$, respectively. Here, the chip clock frequency $f_c$ is set at 1 MHz–20 MHz, and the drift frequency $\Delta f_d$ is set at approximately 600 Hz when the carrier frequency is 2 GHz and the frequency stability of the mobile station is about 0.3 ppm.

The clock signals CK2 and CK3 are supplied to the correlation detectors 48 and 49, respectively. The correlation detectors 48 and 49 detect correlations between the spreading code and the spread-spectrum signals (baseband signals) $S_{2I}$ and $S_{2Q}$ from the A/D converters 15 and 16 by multiplying them, respectively. In this case, since the correlation detector 48 is driven by the clock signal CK2 whose frequency is $f_c+\Delta f_d$, the correlation output of the correlation detector 48 becomes maximum when the chip frequency of the spread-spectrum signal $S_{2I}$ and $S_{2Q}$ agrees with the frequency $f_c+\Delta f_d$. The correlation output will be reduced linearly as the difference between these frequencies increases. Likewise, since the correlation detector 49 is driven by the clock signal CK3 whose frequency is $f_c-\Delta f_d$, the correlation output of the correlation detector 49 becomes maximum when the chip frequency of the spread-spectrum signal $S_{2I}$ and $S_{2Q}$ agrees with the frequency $f_c-\Delta f_d$. The correlation output will be reduced linearly as the difference between these frequencies increases.

Characteristics of the correlation outputs are shown in (A) and (B) of FIG. 3. As will be seen from the characteristics, calculating the difference between the amplitudes of the correlation output of the correlation detectors 48 and 49 will give an S-curve characteristic as shown in (C) of FIG. 3. A circuit for obtaining the S-curve characteristics will be described below.

First, correlation outputs $S_{7I}$ and $S_{7Q}$ from the correlation detector 48 are supplied to a magnitude squared component generating portion 51, which sums up the square of the in-phase component $S_{7I}$ and that of the quadrature component $S_{7Q}$ of the correlation outputs, and produces the summation as a magnitude squared component $S_9$. Likewise, correlation outputs $S_{8I}$ and $S_{8Q}$ from the correlation detector 49 are supplied to a magnitude squared component generating portion 52, which sums up the square of the in-phase component $S_{8I}$ and that of the quadrature component $S_{8Q}$ of the correlation outputs, and produces the summation as a magnitude squared component $S_{10}$.

The magnitude squared components $S_9$ and $S_{10}$ are supplied to comparators 53 and 54, respectively. The comparators 53 and 54 compare the magnitude squared components $S_9$ and $S_{10}$ with a predetermined level to eliminate noise, and produce signals $S_{11}$ and $S_{12}$ which have undergone the noise elimination, respectively.

The output signals $S_{11}$ and $S_{12}$ from the comparators 53 and 54 are supplied to hold circuits 55 and 56, respectively. The hold circuits 55 and 56 hold the signal $S_{11}$ and $S_{12}$ for one symbol length, that is, for one spreading code length. The held signals are outputted as signals $S_{13}$ and $S_{14}$.

The output signals $S_{13}$ and $S_{14}$ from the hold circuits 55 and 56 are supplied to an adder circuit 57, which adds the signals $S_{13}$ and $S_{14}$ in the opposite phase, that is, subtracts the signal $S_{14}$ from the signal $S_{13}$, and outputs the result as a correlation output error signal $S_{15}$. The amplitude of the correlation output error signal $S_{15}$ exhibits the S-curve characteristic as shown in (C) of FIG. 3 in response to the frequency error between the chip clock frequency of the spread-spectrum signal $S_{2I}$ and $S_{2Q}$ and that of the chip clock signal CK1.

The correlation output error signal $S_{15}$ is inputted to a correlation output error/frequency drift converter 58, which includes a memory circuit storing the characteristic as shown in (C) of FIG. 3. The memory circuit receives the correlation output error signal $S_{15}$ at its address input terminals, and outputs the frequency drift from its data output terminals. More specifically, it produces $\cos((\omega_c+\Delta\omega_c)t)$ and $\sin(\omega_c+\Delta\omega_c)t$ as signals $S_{16I}$ and $S_{16Q}$ in response to the radio signal with the intermediate angle frequency of $(\omega_c+\Delta\omega)$, where $\Delta\omega_c$ denotes the frequency drift component between the base station and the mobile station.

The memory circuit is prepared by calculating a correlation output which is the integral of the correlation output error signal $S_{15}$ with respect to the frequency difference between the transmitting side and the receiving side over one spreading code length for each spreading code, and by writing data obtained by the calculation. Thus, the frequency drift signals $S_{16I}$ and $S_{16Q}$ are obtained from the amplitude of the correlation output error signal $S_{15}$.

The frequency drift signals $S_{16I}$ and $S_{16Q}$ are averaged by an averaging circuit 59 to remove noise, and are supplied to the frequency drift correction portion 25 as the frequency correction signals $S_{4I}$ and $S_{4Q}$. The frequency drift correction portion 25 performs complex multiplication between the despread signals $S_{3I}$ and $S_{3Q}$ and the frequency drift correction signals $S_{4I}$ and $S_{4Q}$. Thus, the frequency of the frequency correction signal is subtracted from the frequency of the despread signal, and the frequency correction is accomplished.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A frequency error correction device of a spread spectrum receiver which receives a spread-spectrum signal, said frequency error correction device comprising:
   a first correlation detector despreading the spread-spectrum signal;
   a first clock signal generating portion for producing a first clock signal for driving said first clock signal for driving said first correlation detector;
   a frequency error detection circuit detecting a frequency error between a chip frequency of said spread-spectrum signal and a frequency of said first clock signal, thereby producing a frequency error signal;
   a frequency drift converter converting the frequency error signal into a frequency drift signal as drift correction signal; and
   a frequency drift correction portion performing frequency correction of an output of said first correlation detector in accordance with said frequency correction signal outputted from said frequency drift converter.

2. A frequency error correction device of a spread spectrum receiver which receives a spread-spectrum signal, said frequency error correction device comprising:
   a first correlation detector despreading the spread-spectrum signal;
   a first clock signal generating portion for producing a first clock signal for driving said first clock signal for driving said first correlation detector;
   a frequency error detection circuit detecting a frequency error between a chip frequency of said spread-spectrum signal and a frequency of said first clock signal, thereby producing a frequency correction signal; and
   a frequency drift correction portion performing frequency correction of an output of said first correlation detector in accordance with said frequency correction signal outputted from said frequency error detection circuit, wherein said frequency error detection circuit comprises:
   a second clock signal generating portion producing a second clock signal whose frequency is higher than the frequency of said first clock signal by a predetermined value;
   a third clock signal generating portion producing a third clock signal whose frequency is lower than the frequency of said first clock signal by a predetermined value;
   a second correlation detector despreading said spread-spectrum signal by using said second clock signal; and
   a third correlation detector despreading said spread-spectrum signal by using said third clock signal,
   wherein said frequency error is detected on the basis of a correlation output from said second correlation detector, and a correlation output from said third correlation detector.

3. The frequency error correction device as claimed in claim 2, wherein said frequency error detection circuit further comprises:
   an adder subtracting the correlation output from said third correlation detector from the correlation output from said second correlation detector, thereby producing a correlation output error; and
   a correlation output error/frequency drift converter producing a frequency drift signal which becomes zero when said correlation output error is zero, and which changes in accordance with an S-curve characteristic as the absolute value of said correlation output error increases.

4. The frequency error correction device as claimed in claim 3, wherein said correlation output error/frequency drift converter comprises a memory circuit which stores said S-curve characteristic, receives said correlation output error as an address input, and produces said frequency drift signal as a data output.

5. The frequency error correction device as claimed in claim 4, wherein said frequency error detection circuit further comprising:
   a first magnitude squared component generating portion producing a squared component of the magnitude of the correlation output of said second correlation detector;
   a second magnitude squared component generating portion producing a squared component of the magnitude of the correlation output of said third correlation detector;
   a first comparator comparing an output signal from said first magnitude squared component generating portion with a predetermined reference level, and producing a component that exceeds the reference level; and
   a second comparator comparing an output signal from said second magnitude squared component generating portion with the predetermined reference level, and producing a component that exceeds the reference level,
   wherein said adder subtracts an output from said second comparator from an output from said first comparator, and outputs said correlation output error.

6. The frequency error correction device as claimed in claim 5, wherein said frequency error detection circuit further comprises:
   a first hold circuit connected between said first comparing circuit and said adder, and holding an output of said first comparing circuit; and
   a second hold circuit connected between said second comparing circuit and said adder, and holding an output of said second comparing circuit,
   wherein said adder subtracts an output of said second hold circuit from an output of said first hold circuit, and outputs said correlation output error.

7. The frequency error correction device as claimed in claim 6, wherein said frequency error detection circuit further comprises an averaging circuit averaging the data output of said memory circuit to produce said frequency correction signal.

8. A spread spectrum receiver with a frequency drift correction device for receiving a spread-spectrum signal from a transmitter in a CDMA (Code Division Multiple Access) communication system, said frequency drift correction device comprising:
   a correlation detector despreading the spread-spectrum signal;
   a source of clock signals provided at the receiver;
   a frequency error detection circuit detecting a frequency error between a chip frequency of the spread-spectrum signal and a frequency of the clock source, thereby producing a frequency error signal;
   a frequency drift converter converting the frequency error signal into a frequency drift signal as drift correction signal; and
   a frequency drift correction portion performing frequency correction of an output of the correlation detector in accordance with the frequency correction signal outputted from the frequency drift converter to subtract the frequency of the frequency correction signal from the despreaded signal and accomplish frequency drift correction.

* * * * *